United States Patent
Su

(10) Patent No.: US 6,686,973 B2
(45) Date of Patent: Feb. 3, 2004

(54) METHOD AND APPARATUS FOR AUTOMATICALLY CORRECTING PROJECTION DISPLAY OF PROJECTOR

(75) Inventor: Jimmy Su, Taipei Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 467 days.

(21) Appl. No.: 09/726,471

(22) Filed: Nov. 30, 2000

(65) Prior Publication Data

US 2002/0051095 A1 May 2, 2002

(30) Foreign Application Priority Data

Sep. 14, 2000 (TW) .......................... 89118783 A

(51) Int. Cl.[7] .............. H04N 9/28; H04N 9/31; G03B 21/00; G03B 21/14
(52) U.S. Cl. ............... 348/745; 348/744; 348/746; 348/747; 353/69; 353/70
(58) Field of Search ................ 348/745, 746, 348/747, 744, 756, 806, 580, 581; 353/70, 69, 30–31

(56) References Cited

U.S. PATENT DOCUMENTS

| | | | | |
|---|---|---|---|---|
| 4,656,521 A | * | 4/1987 | Trzeciak et al. ........... 348/744 |
| 5,414,521 A | * | 5/1995 | Ansley ...................... 348/123 |
| 5,584,552 A | * | 12/1996 | Nam-Su et al. .............. 353/70 |
| 5,641,957 A | * | 6/1997 | Chae ..................... 250/231.14 |
| 5,752,758 A | * | 5/1998 | Woo ........................... 353/69 |
| 6,056,408 A | * | 5/2000 | Kobayashi .................. 353/122 |
| 6,222,593 B1 | * | 4/2001 | Higurashi et al. .......... 348/745 |
| 6,305,805 B1 | * | 10/2001 | Liebenow .................... 353/69 |
| 6,310,662 B1 | * | 10/2001 | Sunakawa et al. .......... 348/747 |
| 6,361,171 B1 | * | 3/2002 | Ejiri et al. ................... 353/69 |
| 6,367,933 B1 | * | 4/2002 | Chen et al. ................... 353/69 |
| 6,416,186 B1 | * | 7/2002 | Nakamura .................... 353/69 |
| 6,450,647 B1 | * | 9/2002 | Takeuchi ..................... 353/69 |
| 6,511,185 B1 | * | 1/2003 | Gananathan ................. 353/69 |

* cited by examiner

Primary Examiner—Michael H. Lee
Assistant Examiner—Paulos M. Natnael
(74) Attorney, Agent, or Firm—J.C. Patents

(57) ABSTRACT

A method and apparatus for automatically correcting projection display of a projector. The disposition parameters including disposition distance (or horizontal inclination angle) and vertical inclination angle for the disposing surface are detected first. Whether the disposition distance (or horizontal inclination angle) and the vertical inclination angle are shifted from the predetermined standard values is determined by a control circuit. If the deviation occurs, a correction value according to the deviation is obtained from a look up table, and an input image signal is corrected with the correction value to obtain a corrected image projected on a screen.

14 Claims, 3 Drawing Sheets

METHOD AND APPARATUS FOR AUTOMATICALLY CORRECTING PROJECTION DISPLAY OF PROJECTOR

CROSS-REFERENCE TO RELATED APPLICATION

This application claims the priority benefit of Taiwan application serial no. 89118783, filed Sep. 14, 2000.

BACKGROUND OF THE INVENTION

1. Field of the Invention

The invention relates in general to a method and an apparatus for automatically correcting a projection display of a projector. More particularly, this invention relates to a method and an apparatus for automatically correcting a projection display of a projector.

2. Description of the Related Art

With the projection lens as a reference, when the projection lens is located horizontally, an image projected perpendicularly to the projection lens has a standard projection angle. With such a standard projection angle, the image projected on the screen typically has a rectangular frame. If the projection lens is shifted higher, lower or oblique from the horizontal, that is, when the image projected from the projector is not perpendicular to the projection lens, this rectangular frame is then distorted, normally as a trapezium frame.

In a convention projector with the design of trapezium distortion correction, a trapezium distortion correction software is used to drive an electronic circuit after adjusting the projection angle. A correction image is then generated. As the adjustment of the projection angle is distinguished by human eyes, whether the optimum correction of image distortion is obtained cannot precisely tell. In addition, for non-professional users, the direction of adjustment is always confusing. Therefore, it is difficult to precisely and properly adjust.

SUMMARY OF THE INVENTION

The invention provides a method and an apparatus for automatically correcting a projection display of a projector. The disposition parameters such as the distance between a disposition surface for disposing the projector and a projection axis of the projector, the horizontal inclination angle or vertical inclination angle for the projector can be monitored in real time. From the parameters and an accompanied circuit, the distortion frame can be automatically corrected without being distinguished by a user. When the projector has been shifted during operation, the distorted framed can be corrected via a software. The user does not need to monitor whether there is a distortion or whether the projector is moved all the time.

In the method provided by the invention, disposition parameters of a projector are detected by a detector built in the projector. The disposition parameters include the disposition distance, the horizontal inclination angle between the projection axis and the disposition surface, and the vertical inclination angle between a line normal to the projection axis and a line normal to the disposition surface. Whether any of the disposition parameters deviates from its corresponding standard reference value with which there no distortion occurs is determined by the control circuit. A trapezium correction value according to a deviation of any of the disposition parameters is obtained when the disposition parameter deviates from its standard reference value. An input image signal is corrected with the trapezium correction value.

The apparatus for automatically correcting the projection display of a projector comprises a detector and a control circuit. The detector detects the disposition parameters of the projector in a real time. The control circuit receives the disposition parameters and corrects an input image signal with a trapezium correction value obtained according to a deviation between the disposition parameters and standard reference values of the disposition parameters.

The detector further comprises a disposition distance detector installed in the projector to detect the disposition distance and the vertical inclination angle. Alternatively, the detector comprises an inclination angle detector to detect both the vertical and horizontal inclination angles. In addition, a video signal decoder is include to receive and decode an input video signal. An input frame buffer is to receive and temporarily store the video signal decoded by the video signal decoder. A look up table is to provide a trapezium correction value according to the disposition parameters. An output frame buffer is to receive the corrected video signal from the control circuit and to project an image on a screen according to the corrected video signal via an optical system.

Both the foregoing general description and the following detailed description are exemplary and explanatory only and are not restrictive of the invention, as claimed.

DESCRIPTION OF THE PREFERRED EMBODIMENTS

Ideally, a projector is disposed on a disposition surface with an axis of a projection light parallel to the disposition surface. When the projection axis is parallel to the disposition surface and perpendicular to a screen where projection light is incident, an image without distortion can be obtained. In the real case, the projector is often disposed with an angle between the projection axis and the disposition surface. In the method and apparatus for automatically correcting the projection display of a projector when the projector is not aligned. The projector comprises a detector that can detect the angle between the projection light axis of the projector and the disposition surface. The detector is disposed in the projector near the projection lens. The detector can also detect a distance between the detector and the disposition surface. Hereinafter, the angle between the projection axis and the disposition surface is referred as the horizontal inclination angle, while the distance between the detector and the disposition surface is referred as the disposition distance. From the deviations between the detected disposition distance and the horizontal inclination angle and the standard values thereof, the corresponding trapezium corrections can be obtained from the table comprising a database or a software algorithm. The image projected on the projection screen can thus be corrected by the trapezium correction.

Figure 1A:
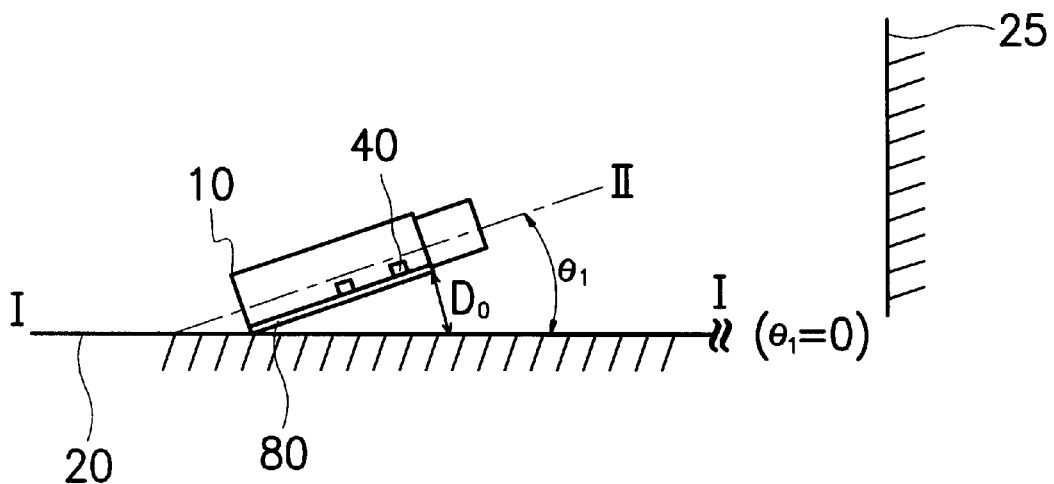
FIG. 1A and FIG. 1B are the schematic drawings illustrating the definition of disposition distance, horizontal and vertical inclinations of the projector.
Figure 1B:
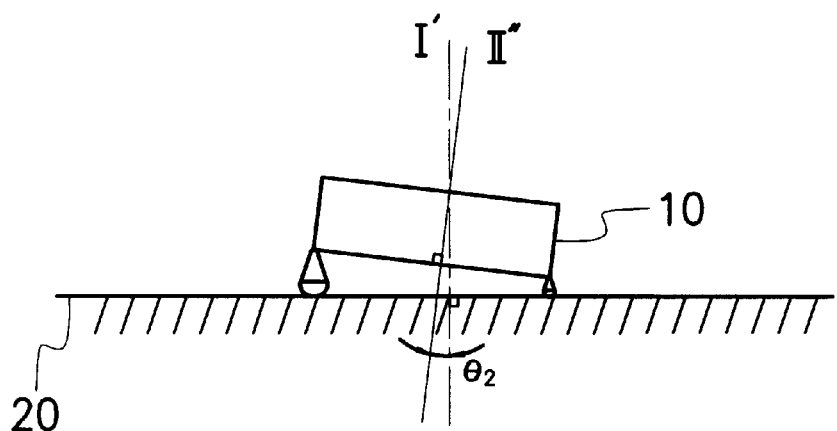

Referring to FIGS. 1A and 1B, a projector 10 is disposed on a disposition surface 20. The disposition surface 20 is the horizontal I in this embodiment. In FIG. 1A, a side view of the disposition of the projector 10 and the relative positions of the disposition surface 20, the projector and the screen 25 is shown. A screen 25 perpendicular to the horizontal disposition surface 20 is also illustrated in FIG. 1A. The projector 10 has a projection axis II along which an image is projected. The angle between the projection axis II of the projector 10 and the disposition surface 20, that is, the horizontal angle is denoted as $\theta_1$. The projector 10 comprises a detector 40. The shortest distance between the detector 40 and disposition surface 25, that is, the disposition distance, is denoted as $D_0$. FIG. 1B shows a front view of the projector 10, that is, the observer is in front of the screen 25 and facing the output of the projector 10. When the projector 10 is vertically inclined, that is, the angle between the normal line I' of the disposition surface 20 and the normal line II' of the projection axis II, is more than zero degree. This angle is referred as the vertical inclination angle and is denoted as $\theta_2$ hereinafter.

Referring to FIG. 1A and FIG. 1B, when the projection axis is parallel to the disposition surface 20, that is, the horizontal I, and perpendicular to the screen 25, an image without distortion is obtained. Typically, the image has a rectangular frame. Under this circumstance, the horizontal angle $\theta_1$, the disposition distance $D_0$ and the vertical $\theta_2$ are all equal to zero. However, when the projector 10 is lifted or inclined vertically or horizontally, the rectangular frame is then distorted into a trapezium frame.

It is appreciated that, instead of being disposed on the disposition surface 20, the projector 10 can also be suspended along the disposition surface 20. Again, the projector 10 has the projection axis II which is supposed to be parallel to the horizontal I without causing the distortion.

In the invention, the projector 10 comprises a detector 40 located near to the output of the projector to automatically detect the horizontal angle $\theta_1$, the disposition distance $D_0$ and the vertical angle $\theta_2$. The detected data are then fed into a control circuit 80 for correction the image frame.

Figure 2:
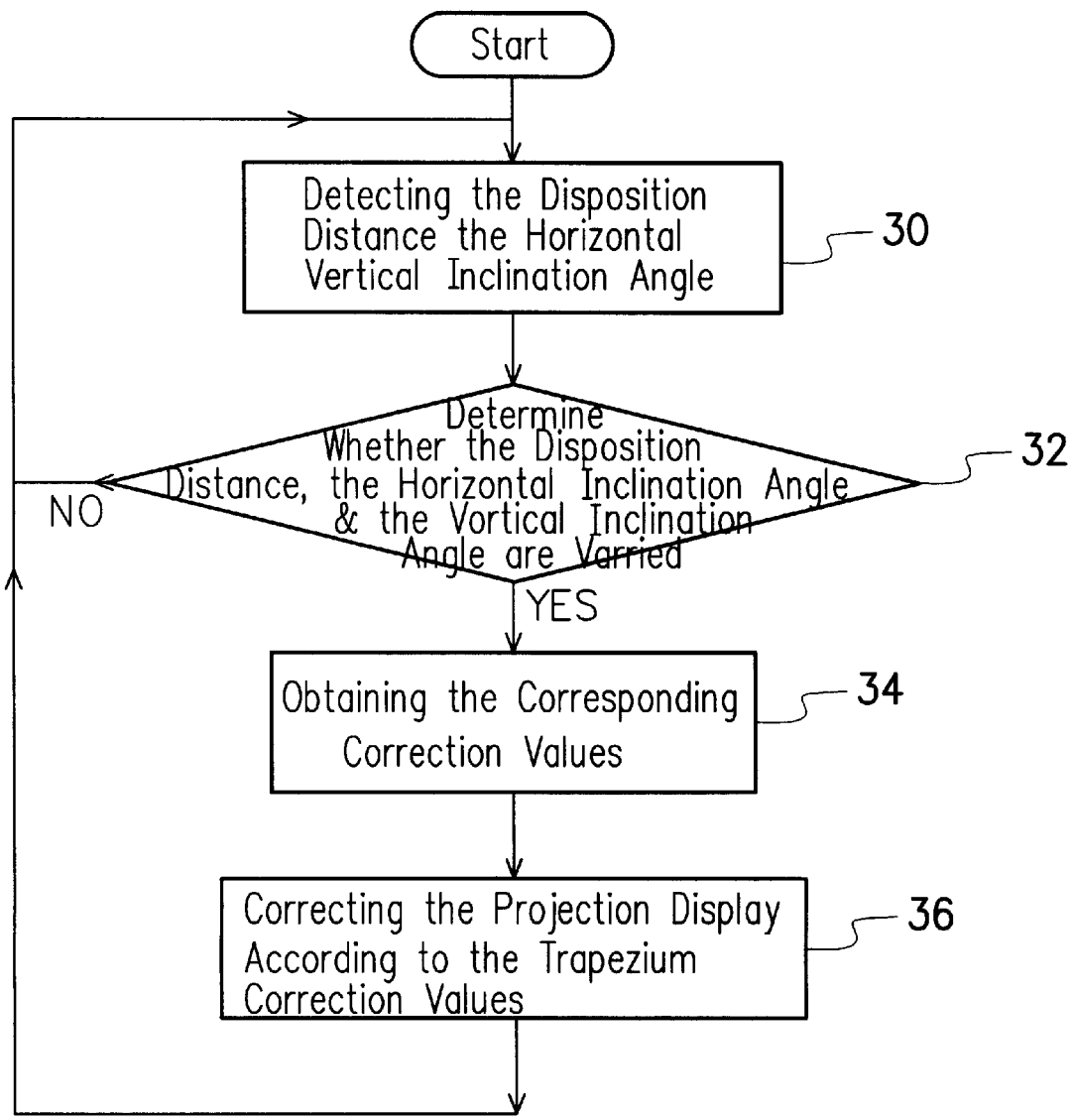
FIG. 2 is a block diagram showing the process of the method for automatically correcting the projection display from a projector.

In FIG. 2, a flow chart of the method for automatically correcting the projection image is illustrated. In step 30, the disposition distance $D_0$, the horizontal inclination angle $\theta_1$, and the vertical angle $\theta_2$ are detected by the detector 40. As mentioned above, when the projector 10 is horizontally disposed, that is, when the disposition distance $D_0$, the horizontal inclination angle $\theta_1$, and the vertical angle $\theta_2$ are equal to standard reference values, an image without distortion can be obtained. In contrast, one the projector 10 is shifted and mis-aligned, the values of these parameters are not zero and a distortion occurs.

The detector 40 installed in the projector can automatically detect the horizontal and vertical inclination angles $\theta_1$ and $\theta_2$ and the disposition distance $D_0$ in real time. The horizontal and vertical inclination angles $\theta_1$ and $\theta_2$ and the disposition distance $D_0$ are then compared to the standard reference values. Whether the projector 10 is shifted is known, and the deviation from the standard references is obtained. When the real time measurement of the horizontal and vertical inclination angles $\theta_1$ and $\theta_2$ and the disposition distance $D_0$ are the same as the standard reference values, the process goes back to step 30 for further real time detection and measurement. If any of the horizontal and vertical inclination angles $\theta_1$ and $\theta_2$ and the disposition distance $D_0$ are different its standard reference value, a trapezium distortion is caused to cause the quality of the projected image. Therefore, the step 34 is performed. In step 34, a keystone correction value (or correction value) corresponding to the deviated value is obtained according the deviation by the control circuit 80. The deviated horizontal inclination angle $\theta_1$ corresponds to a horizontal keystone correction value, the deviated vertical inclination angle $\theta_2$ corresponds to a vertical keystone correction value, and the deviated disposition distance corresponds to a distance keystone correction value. For practical application, either one of the horizontal inclination angle $\theta_1$ or the disposition distance $D_0$ is detected to reflect the shift of the projector 10 in certain direction. The horizontal, vertical and distance keystone correction values are built in a look up table (LUT) and saved in a built-in memory. Alternatively, these keystone correction values can be derived by software algorithm. Table 1, Table 2 and Table 3 give examples of the horizontal, vertical and distance correction values, respectively.

TABLE 1

| Horizontal Inclination angle $\theta_1$ | Horizontal Keystone Correction Value |
|---|---|
| −30° | −128 |
| −10° | −64 |
| 0° | 0 |
| 10° | 64 |
| 30° | 128 |

TABLE 2

| Vertical Inclination angle $\theta_2$ | Vertical Keystone Correction Value |
|---|---|
| −30° | −128 |
| −10° | −64 |
| 0° | 0 |
| 10° | 64 |
| 30° | 128 |

TABLE 3

| Disposition Distance $D_0$ | Distance Keyston Correction Values |
|---|---|
| −10 cm | −128 |
| −5 cm | −64 |
| 0 cm | 0 |
| 5 cm | 64 |
| 10 cm | 128 |

From Table 1, when a horizontal inclination angle $\theta_1$ is −30°, the corresponding keystone correction value is −128. From Table 2, when a vertical inclination angle $\theta_2$ is +30°, the corresponding keystone correction value is +128. From Table 3, when the disposition distance $D_0$ is −5 cm, the keystone correction value is −64. It is appreciated that the keystone correction values for trapezium distortion are not fixed or constant all the time. The keystone correction values vary for different projectors. These keystone correction values are corrected and obtained by disposing the projector on the horizontal, and then stored in a memory as a look up table database. The look up table can be stored in an electrically erasable programmable read only memory (EEPROM) or a flash memory in the control circuit 80.

After the keystone correction values corresponding to any of the horizontal, vertical inclination angles $\theta_1$ and $\theta_2$ and the disposition distance $D_0$ are obtained, the step 36 is performed. The control circuit 80 corrects the trapezium distortion on the screen 25 according to the keystone correction values. After the trapezium distortion is corrected, the process goes back to step 30 to keep monitoring the disposition of the projector 10.

The invention adapts an electronic way to correct the trapezium distortion. While performing the correction, the position of the projector 10 is not adjusted. In contrast, the image projected on the screen 25 is corrected according to the detected horizontal and vertical inclination angles $\theta_1$ and $\theta_2$ and the disposition distance $D_0$.

Figure 3:
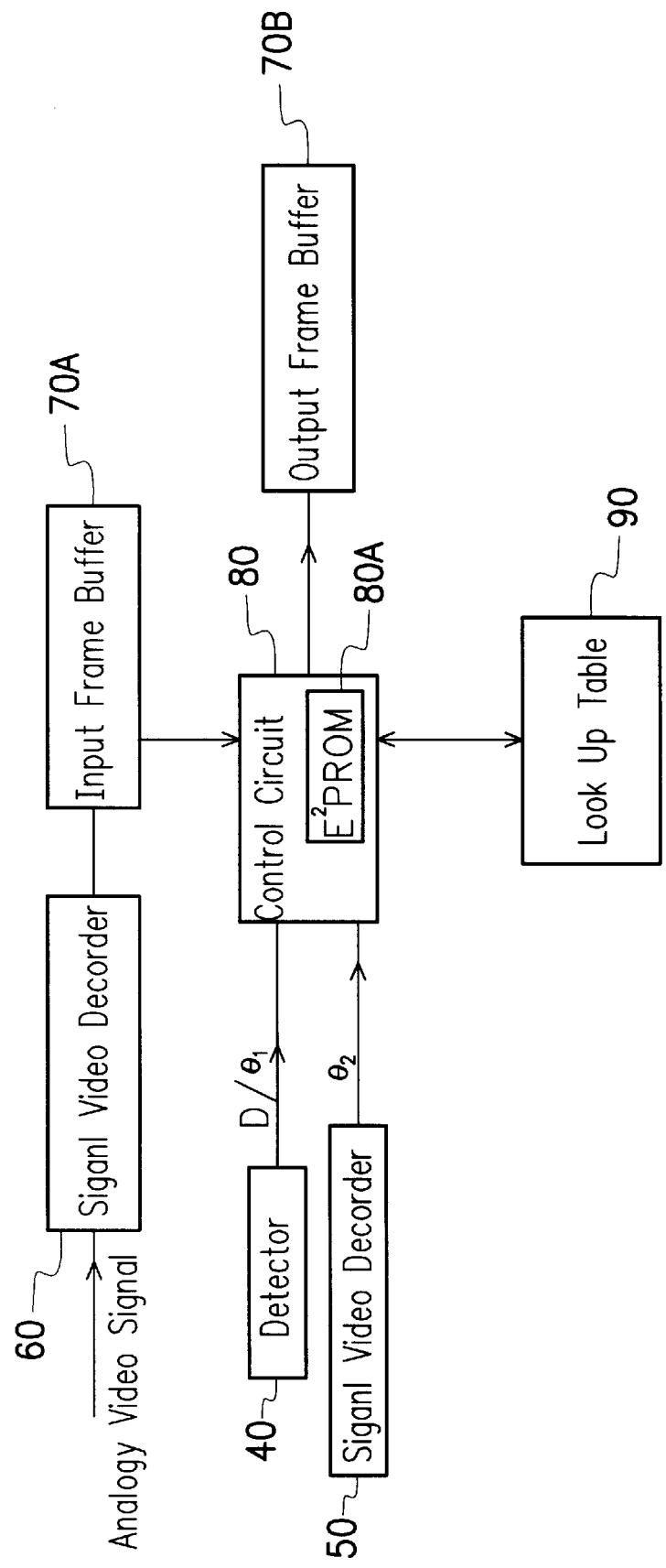
FIG. 3 shows a block diagram of the apparatus for automatically correction the projection display of a projector.

FIG. 3 shows a block diagram of the apparatus for automatically correcting the image projected from a projector. The apparatus comprises a detector 40, a control circuit 80, a correction value look up table 90, a video decoder 60, an input frame buffer 70A and an output frame buffer 70B. The detector 40, the look up table 90, the input and output frame buffers 70 and 70B are coupled to the control circuit 80. The video decoder 60 is connected to the control circuit 80 via the input frame buffer 70A.

The video signal decoder 60 receives an analog digital video signal and outputs the coordinate of the image frame to the input frame buffer 70A. The input frame buffer 70A temporarily store the video signal decoded by the video signal decoder 60. After receiving and processing the signal of the image frame from the input frame buffer 70A, the control circuit 80 outputs a signal to the output frame buffer 70B. The output frame buffer 70B temporarily receive the video signal corrected by the control circuit 80 and temporarily store the coordinate data of the corrected video signal. According to the data stored in the output frame buffer 70B, an image frame is projected to the screen via an optical system.

The detector 40 can detect or measure both the disposition distance $D_0$ and the horizontal and vertical inclination angles $\theta_1$ and $\theta_2$. After being detected, these disposition parameters are fed into the control circuit 80 which compares these parameters to the standard reference values, that is, the parameters when there is no distortion. If there is no deviation, the signal sent from the input frame buffer 70A is processed and output to the output frame buffer 70B. According to the data stored in the output frame buffer 70B, an image is projected on the screen 25 via an optical system.

Alternatively, the detector 40 may further comprise two individual detectors, that is, an inclination angle detector and a disposition distance detector. The inclination angle detector is used to detect the vertical and horizontal inclination angles, while the disposition distance detector is used to detect the disposition distance.

In contrast, when the disposition parameters deviate from the standard reference values, the projected image is distorted. The correction values corresponding to these deviated parameters are obtained from the look up table 90 by the control circuit 80. According to the data stored in the memory 80A, for example, the EEPROM built in the control circuit 80, the trapezium distortion correction is performed. For example, the data input from the input frame buffer 70A is added with the correction values to compensate or correct the frame coordinate of the image. The corrected frame coordinate is then input to the output frame buffer 70B. According to the data stored in the output frame buffer 70B, the image is projected to the screen 25.

Therefore, when the disposition of the projector 10 causes the trapezium distortion, the user does not have to adjust the position of the projector 10. Instead, the disposition parameters including the disposition distance $D_0$, the horizontal and vertical inclination angle $\theta_1$ and $\theta_2$ can be automatically detected by the detector 40 and then input to the control circuit 80. According to the deviation between the real time disposition parameters and the standard reference values with which the projector 10 is well aligned, the projected image can be corrected. The user does not have to monitor or check whether the projector 10 is aligned since once the projector is misaligned, the distortion will be automatically corrected.

According to the above, the method and apparatus for automatically correcting the projection image of the projector invention, the disposition parameters can be detected by a detector in a real time without being measured manually. When the disposition parameters deviate from the standard reference values, the correction values can be obtained according to the deviation. As a result, the image projected on the screen can be corrected with the correction values without resulting in the trapezium distortion.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An apparatus for correcting a projection display of a projector, comprising:
    a detector, to detect a plurality disposition parameters of the projector; and
    a control circuit, to receive the disposition parameters and correct an input image signal with a keystone correction value obtained according to a deviation between the disposition parameters and standard reference values of the disposition parameters;
    wherein the detector comprises:
        a disposition distance detector installed in the projector, to detect a disposition distance between the disposition distance detector and a disposition surface for disposing the projector; and
        an inclination angle detector installed in the projector, to detect a vertical inclination angle between a line normal to a projection axis of the projector and a line normal to the disposition surface.

2. The apparatus according to claim 1, wherein a video decoder is further coupled to the control circuit to receive and decode the input image signal.

3. The apparatus according to claim 2, comprising further an input frame buffer and an output frame buffer; wherein
    the input frame buffer is coupled between the video signal decoder to received the video signal decoded by the video signal decoder and temporarily store a coordinate data of the video signal; and
    the output frame buffer is coupled to the control circuit to receive the video signal corrected by the control circuit and temporarily store a coordinate data of the corrected video signal.

4. The apparatus according to claim 1, comprising further a look up table that stores correction values of the disposition parameters.

5. The apparatus according to claim 4, wherein the look up table is stored in a memory.

6. The apparatus according to claim 1, wherein the control circuit further comprises a memory for storing a software to execute the correction.

7. The apparatus according to claim 1, wherein the disposition parameters comprise:
    a disposition distance, between the detector and a disposition surface for disposing the projector;
    a horizontal inclination angle, between a projection axis and the deposition surface; and a vertical inclination angle, between a line normal to the projection axis and a line normal to the deposition surface.

8. An apparatus for correcting a projection display of a projector, comprising:

a detector, to detect a plurality disposition parameters of the projector; and a control circuit, to receive the disposition parameters and correct an input image signal with a keystone correction value obtained according to a deviation between the disposition parameters and standard reference values of the disposition parameters;

wherein the detector comprises an inclination angle detector to detect:

a horizontal inclination angle between a projection axis of the projection and a disposition surface for disposing the projector; and a vertical inclination angle between a line normal to the projection axis and a line normal to the disposition surface.

9. The apparatus according to claim 8, wherein a video decoder is further coupled to the control circuit to receive and decode the input image signal.

10. The apparatus according to claim 9, comprising further an input frame buffer and an output frame buffer; wherein the input frame buffer is coupled between the video signal decoder to received the video signal decoded by the video signal decoder and temporarily store a coordinate data of the video signal; and the output frame buffer is coupled to the control circuit to receive the video signal corrected by the control circuit and temporarily store a coordinate data of the corrected video signal.

11. The apparatus according to claim 8, comprising further a look up table that stores correction values of the disposition parameters.

12. The apparatus according to claim 8, wherein the control circuit further comprises a memory for storing a software to execute the correction.

13. The apparatus according to claim 11, wherein the look up table is stored in a memory.

14. The apparatus according to claim 8, wherein the disposition parameters comprise:

a disposition distance, between the detector and a disposition surface for disposing the projector;

a horizontal inclination angle, between a projection axis and the deposition surface; and a vertical inclination angle, between a line normal to the projection axis and a line normal to the deposition surface.

* * * * *